(12) United States Patent
Yang et al.

(10) Patent No.: US 9,390,360 B1
(45) Date of Patent: Jul. 12, 2016

(54) NFC PAYMENT MOUDLE AND CONTROLLING METHOD THEREOF

(71) Applicant: ABOMEM TECHNOLOGY CORP., Miaoli County (TW)

(72) Inventors: Ming-Heng Yang, Taipei (TW); Ching-Hsiang Hung, Taipei (TW)

(73) Assignee: ABOMEM TECHNOLOGY CORP., Miaoli County (TW)

( * ) Notice: Subject to any disclaimer, the term of this patent is extended or adjusted under 35 U.S.C. 154(b) by 0 days.

(21) Appl. No.: 14/828,505

(22) Filed: Aug. 17, 2015

(30) Foreign Application Priority Data

Mar. 26, 2015 (CN) .......................... 2015 1 0135918

(51) Int. Cl.
| | |
|---|---|
| G06K 5/00 | (2006.01) |
| G06K 15/00 | (2006.01) |
| G06K 7/08 | (2006.01) |
| G06K 19/06 | (2006.01) |
| G06K 19/07 | (2006.01) |

(52) U.S. Cl.
CPC ........ *G06K 19/0727* (2013.01); *G06K 19/0723* (2013.01)

(58) Field of Classification Search
USPC .......................................... 235/375, 451, 492
See application file for complete search history.

(56) References Cited

U.S. PATENT DOCUMENTS

| | | | | | |
|---|---|---|---|---|---|
| 4,817,115 | A | * | 3/1989 | Campo ............... | H04L 25/4902 375/238 |
| 5,847,447 | A | * | 12/1998 | Rozin .................... | G06K 7/087 235/451 |
| 6,202,927 | B1 | * | 3/2001 | Bashan .............. | G06K 19/0705 235/451 |
| 8,543,163 | B2 | * | 9/2013 | Jin ....................... | G06K 7/0008 235/375 |
| 8,762,742 | B2 | | 6/2014 | Buer | |
| 8,818,297 | B2 | | 8/2014 | Merlin | |
| 2004/0062012 | A1 | * | 4/2004 | Murohara .......... | G06K 19/0726 361/737 |
| 2006/0103535 | A1 | * | 5/2006 | Pahlaven ............ | G06K 7/10306 340/572.1 |
| 2009/0061852 | A1 | * | 3/2009 | Feher .................... | H04M 3/382 455/426.1 |
| 2010/0044444 | A1 | * | 2/2010 | Jain .................... | G06K 7/10237 235/492 |
| 2010/0317318 | A1 | * | 12/2010 | Carter ................... | G06Q 20/20 455/408 |
| 2011/0293033 | A1 | * | 12/2011 | Kushnir .............. | H04L 27/2614 375/295 |
| 2014/0019367 | A1 | | 1/2014 | Khan et al. | |
| 2014/0287683 | A1 | * | 9/2014 | Rankl ................ | G06Q 20/3278 455/41.1 |
| 2015/0116032 | A1 | * | 4/2015 | Signoff ................. | H03F 1/3241 330/149 |
| 2015/0235204 | A1 | * | 8/2015 | Wallner ............. | G06Q 20/3278 705/39 |

FOREIGN PATENT DOCUMENTS

WO 2011041447 A2 4/2011

* cited by examiner

*Primary Examiner* — Tuyen K Vo
(74) *Attorney, Agent, or Firm* — CKC & Partners Co. Ltd.

(57) ABSTRACT

A NFC payment module and controlling method are provided. The NFC payment module is embedded in a smart device and includes an encapsulation shell, a micro controller, a radio-frequency chip, an antenna, and a security chip. The phase detection and the power amplification can be performed by the radio-frequency chip with the antenna, which is commanded by the smart device. Therefore, the modulation phase angle is adjusting until the modulation phase angel is equal to the specific phase angle of the transaction signal.

22 Claims, 8 Drawing Sheets

NFC PAYMENT MOUDLE AND CONTROLLING METHOD THEREOF

RELATED APPLICATIONS

This application claims priority to China Application Serial Number 201510135918.1, filed Mar. 26, 2015, which is herein incorporated by reference.

BACKGROUND

1. Technical Field

The present disclosure relates to a NFC payment module which is controlled in phase modulation.

2. Description of Related Art

Near Field Communication (NFC) is a kind of point-to-point communication technology that utilizing the radio frequency. When data transmission on NFC is incorporated with data encryption/decryption for providing authentication and anti-counterfeit functionalities, the NFC is applicable to the micropayment and the mobile payment.

In theory, the NFC can transmit data within 10 cm at the speed of 106 kbit/ms to 848 kbit/ms through the amplitude/offset modulation technology. Actually, the antenna of the NFC has different structure and small size in order to be installed into a small electronic device, thus the induction and pay function of the NFC payment device can only work properly in the case that the NFC payment device close to the NFC reader as possible, even touch the NFC reader, to face the induction coil of the NFC payment device to the induction coil of the NFC reader for completing the mutual communication.

Furthermore, the battery and the shielding case of the electronic device also have influences on the weak induction efficiency of the NFC device. Adding an extra booster (e.g. Ferrite Sheet) to the NFC device is a possible method to increase the induction of the NFC device. However, this method will lead to complicated process and high cost.

SUMMARY

According to one embodiment of the present disclosure, a NFC payment module for being applied to a smart electronic device, the NFC payment module has an encapsulation shell, a micro-controller, a radio frequency chip, an antenna and a security chip. The encapsulation shell is disposed in the smart electronic device. The micro-controller is disposed in the encapsulation shell, the micro-controller outputs a phase detection command and a power amplification command according to an application program instruction of the smart electronic device. The radio frequency chip is disposed in the encapsulation shell, the radio frequency chip executes the phase detection command and the power amplification command. The antenna is disposed in the encapsulation shell and is electrically connected to the radio frequency chip, the antenna receives at least one transaction signal according to the phase detection command, wherein the transaction signal has a specific phase angle. The security chip is disposed in the encapsulation shell, the security chip has a SWP signal pin, the security chip is connected to the radio frequency chip and receives the transaction signal by the SWP signal pin to verify the transaction signal and determine the specific phase angle. Wherein when the transaction signal is verified as invalid by the security chip, the security chip informs the micro-controller for outputting a phase modulating command to inform the radio frequency chip to adjust a modulation phase angle.

According to another embodiment of the present disclosure, a NFC payment module for being applied to the smart electronic device is provided, the NFC payment module has a radio frequency chip and an antenna. The radio frequency chip is electrically connected to the smart electronic device, the radio frequency chip executes a phase detection command and a power amplification command which is output from the smart electronic device. The antenna is electrically connected to the radio frequency chip, the antenna receives at least one transaction signal according to the phase detection command, wherein the transaction signal has a specific phase angle. Wherein the smart electronic device outputs a phase modulating command to inform the radio frequency chip to adjust a modulation phase angle while the transaction signal is invalid.

According to still another embodiment of the present disclosure, a NFC payment module controlling method for performing payment transaction by a smart electronic device with a NFC payment module is provided, the NFC payment module controlling method has the following step: an application program instruction is executed to a micro-controller of the NFC payment module by the smart electronic device; a phase detection command and a power amplification command are output to a radio frequency chip of the NFC payment module according to the application program instruction by the micro-controller, the phase detection command and the power amplification command are executed by the radio frequency chip; a modulation phase angle is adjusted and at least one transaction signal is received in a time period and a phase interval according the phase detection command by an antenna of the NFC payment module, wherein the transaction signal has a specific phase angle; the transaction signal and the specific phase angle are verified and determined by a security chip of the NFC payment module; the micro-controller is controlled by the security chip to output a phase modulating command to inform the radio frequency chip to adjust the modulation phase angle until the modulation phase angle is equal to the specific phase angle.

According to another embodiment of the present disclosure, a NFC payment module controlling method for performing payment transaction by a smart electronic device with a NFC payment module is provided, the NFC payment module controlling method has the following step: an application program instruction is executed by a micro-controller of the smart electronic device; a phase detection command and a power amplification command are output to a radio frequency chip of the NFC payment module according to the application program instruction by the micro-controller, the phase detection command and the power amplification command are executed by the radio frequency chip; a modulation phase angle is adjusted and at least one transaction signal is received in a time period and a phase interval according to the phase detection command by an antenna of the NFC payment module, which the transaction signal has a specific phase angle; the transaction signal is verified and the specific phase angle is determined by a security chip of the smart electronic device; the micro-controller is controlled by the security chip to output a phase modulating command to inform the radio frequency chip to adjust the modulation phase angle until the modulation phase angle is equal to the specific phase angle.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
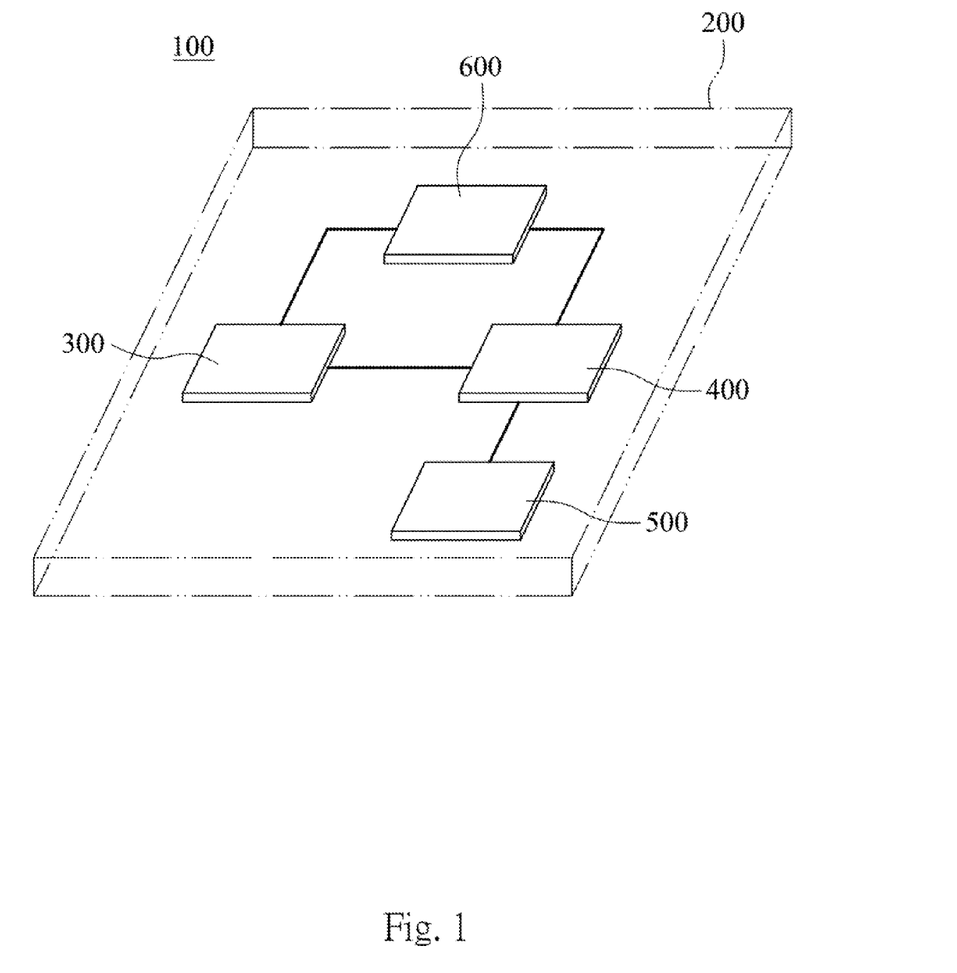
FIG. 1 is a three-dimensional diagram of a NFC payment module according to an embodiment of present disclosure.
Figure 2:
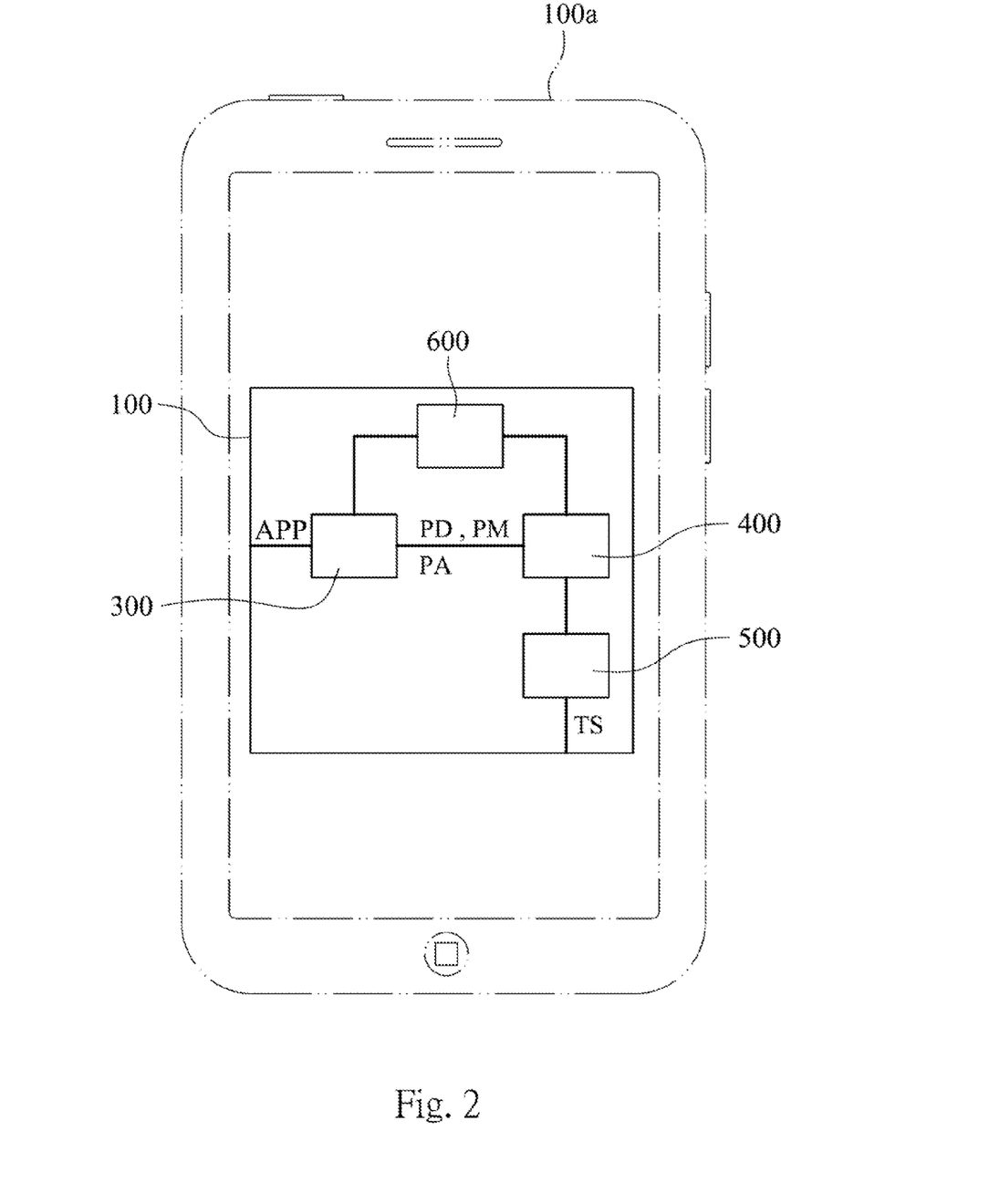
FIG. 2 is a schematic diagram showing the NFC payment module of FIG. 1 being applied to a smart electronic device.

FIG. 1 is a three-dimensional diagram of a NFC payment module according to an embodiment of present disclosure. FIG. 2 is a schematic diagram showing the NFC payment module of FIG. 1 being applied to a smart electronic device. In FIG. 1 and FIG. 2, the NFC payment module 100 is applicable to the smart electronic device 100a, the NFC payment module 100 has an encapsulation shell 200, a micro-controller 300, a radio frequency chip 400, an antenna 500 and a security chip 600.

The aforementioned smart electronic device 100a can be a smart phone, a smart watch, a tablet PC, or other electronic that can execute an application (APP).

The encapsulation shell 200 is disposed in the smart electronic device 100a and is used for packaging the micro controller 300, the radio frequency chip 400, the antenna 500 and the security chip 600, the encapsulation shell 200 shown in FIG. 1 is simply a schematization.

The micro controller 300 is disposed in the encapsulation shell 200, the micro-controller 300 outputs a phase detection command PD and a power amplification command PA according to an application program instruction APP of the smart electronic device 100a.

The radio frequency chip 400 is disposed in the encapsulation shell 200 and is electrically connected to the micro controller 300, the radio frequency chip 400 executes the phase detection command PD and the power amplification command PA.

The antenna 500 is disposed in the encapsulation shell 200 and is electrically connected to the radio frequency chip 400. The antenna 500 receives at least one transaction signal TS according to the phase detection command PD, wherein the transaction signal TS has a specific phase angle. The antenna 500 can be a 2D wire utilizing PCB layout technology or a 3D chip being directly packaged.

The security chip 600 is disposed in the encapsulation shell 200 and is connected to the radio frequency chip 400. The security chip 600 receives the transaction signal TS to verify the transaction signal TS and determine the specific phase angle of the transaction signal TS.

The security chip 600 informs the micro-controller 300 to output a phase modulating command PM to modulate the radio frequency chip 400 when the transaction signal TS is invalid.

More specially, the radio frequency chip 400 executes the phase detection command PD and adjusts a modulation phase angle, the radio frequency chip 400 adjusts the modulation phase angle according to a time period and a phase interval. For example, the time period can be from 1 milliseconds to 22 milliseconds, the phase interval can be from 30 degrees to 60 degree.

Figure 3:
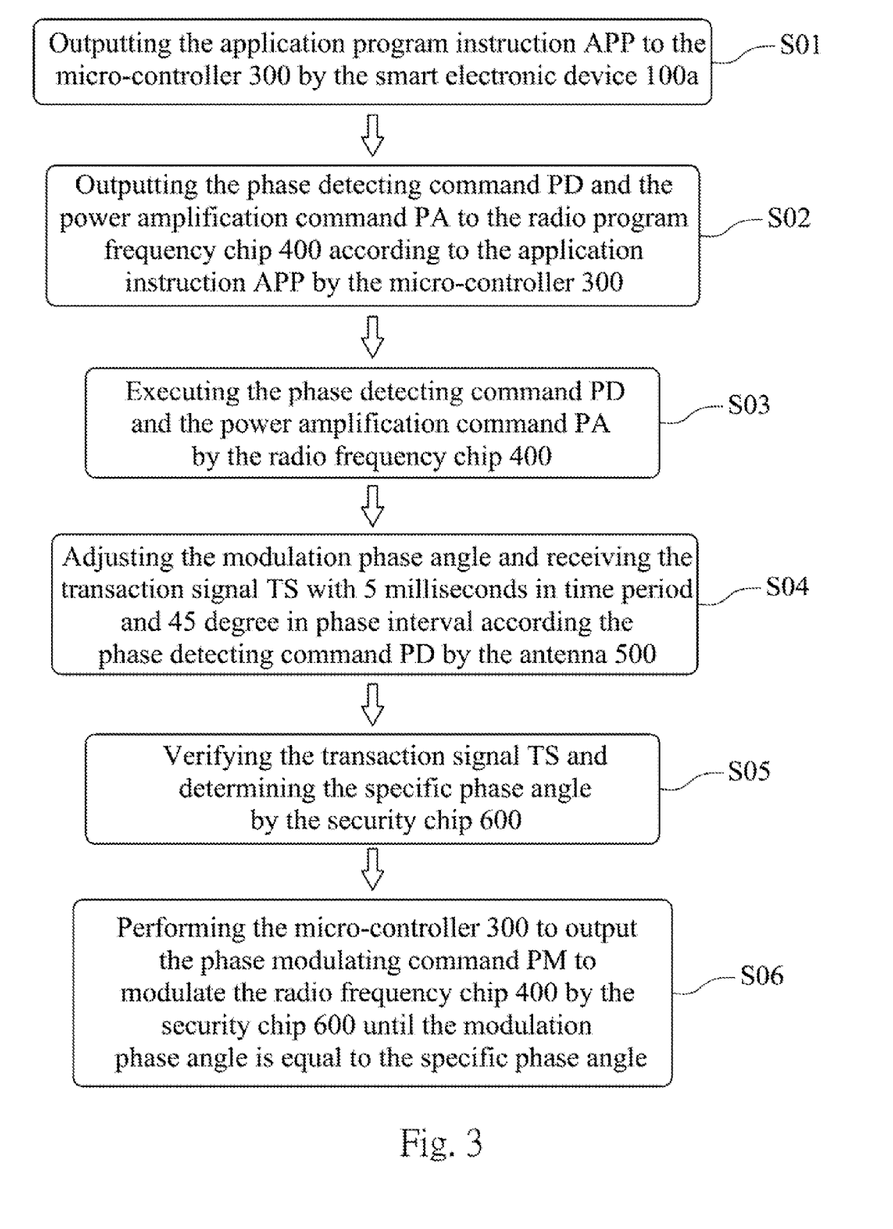
FIG. 3 is a flow chart showing the NFC payment module being applied to the smart electronic device of FIG. 2.

FIG. 3 is a flow chart showing the steps of applying the aforementioned NFC payment module 100 to the smart electronic device. The steps has:

Step S01: outputting the application program instruction APP to the micro-controller 300 by the smart electronic device 100a.

Step S02: outputting the phase detection command PD and the power amplification command PA to the radio frequency chip 400 according to the application program instruction APP by the micro-controller 300.

Step S03: executing the phase detection command PD and the power amplification command PA by the radio frequency chip 400.

Step S04: adjusting the modulation phase angle and receiving the transaction signal TS with 5 milliseconds in time period and 45 degree in phase interval according the phase detection command by the antenna 500.

Step S05: verifying the transaction signal TS and determining the specific phase angle by the security chip 600.

Step S06: performing the micro-controller 300 to output the phase modulating command PM to modulate the radio frequency chip 400 by the security chip 600 until the modulation phase angle is equal to the specific phase angle.

In this embodiment, the time period is 5 milliseconds, and the phase interval is 45 degrees. The application program instruction APP of the smart electronic device 100a controls the micro-controller 300 to executes the phase detection commands, the radio frequency chip 400 adjusts the modulation phase angle in per 5 milliseconds with the antenna 500 until the security chip 600 can determine the specific phase angle of the transaction signal TS, wherein the specific phase angle is equal to the modulation phase angle, therefore the security chip 600 will outputs the phase modulating command to control the micro controller 300 for keeping the modulation phase angle. For instance, the micro-controller 300 controls the antenna 500 with radio frequency chip 400 to make the modulation phase angle at 45 degrees as the fifth second, then the security chip 600 will estimate whether the antenna 500 receives the transaction signal TS at 45 degrees of the modulation phase angle and perform the payment verification. If the transaction signal TS is invalid means that the modulation phase angle mismatches the specific phase angle. The micro-controller 300 controls the antenna 500 with radio frequency chip 400 to make the modulation phase angle at 90 degrees as the tenth second, then the security chip 600 will estimate transaction signal TS again. The security chip 600 cycles the above action until the transaction signal TS is equal to the specific phase angle, the micro-controller 300 controls the antenna 500 with radio frequency chip 400 to keep the modulation phase angle to make payment.

Moreover, the security chip is connected to the radio frequency chip by a SWP signal pin (unshown). A built-in software/hardware interface of the security chip can transform the transaction signal to a readable form signal with the micro-controller, therefore the micro-controller can read the transaction signal directly and need not to transform the transaction signal to a SWP signal by an extra bridge chip.

Figure 4:
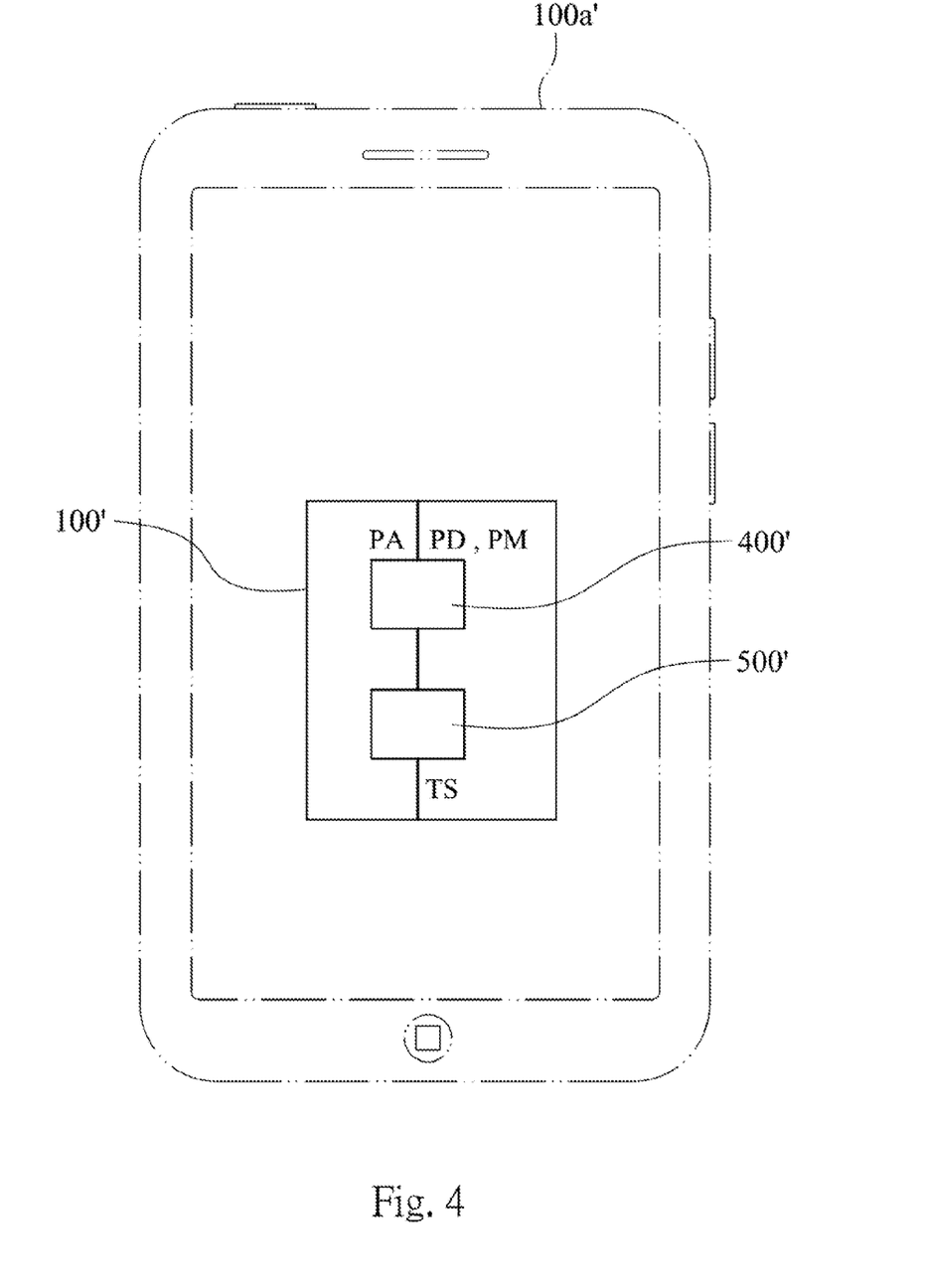
FIG. 4 is a schematic diagram showing the NFC payment module being applied to the smart electronic device module according to another embodiment of present disclosure.

FIG. 4 is a schematic diagram showing the NFC payment module 100' being applied to the smart electronic device 100a' module according to another embodiment of present disclosure. In this embodiment, the NFC payment module 100' only comprises the radio frequency chip 400' and the antenna 500', the functions of the micro-controller and the security chip of the above embodiment can be performed by the smart electronic device 100a' itself. The smart electronic device 100a' can be a smart phone, a smart watch, a tablet PC, or other electronic, which can have controlling features and security verification features, it will be readily apparent to achieve the hardware function by the software program for person having ordinary skill in the art.

Figure 5:
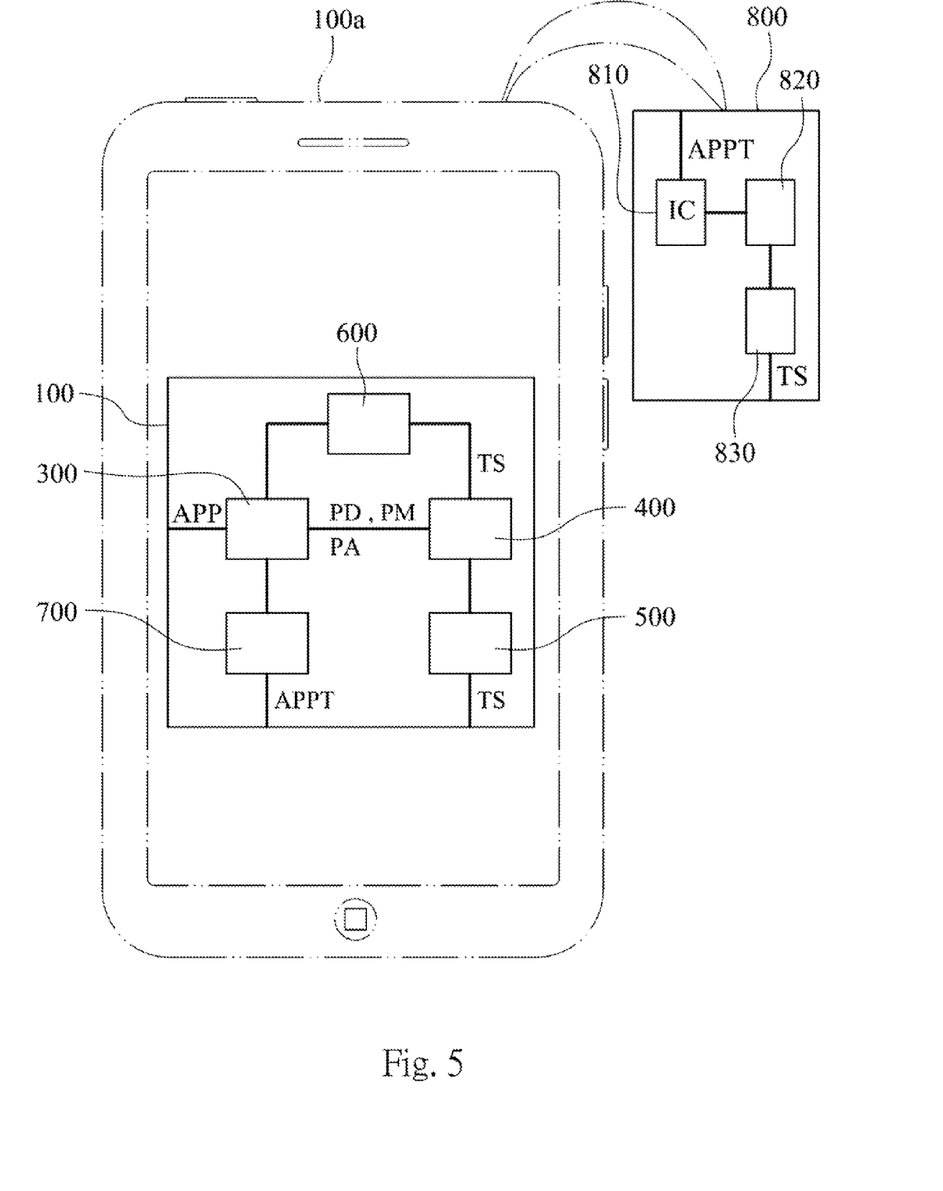
FIG. 5 is a schematic diagram showing the NFC payment module being applied to the smart electronic device according to further another embodiment of present disclosure.
Figure 6:
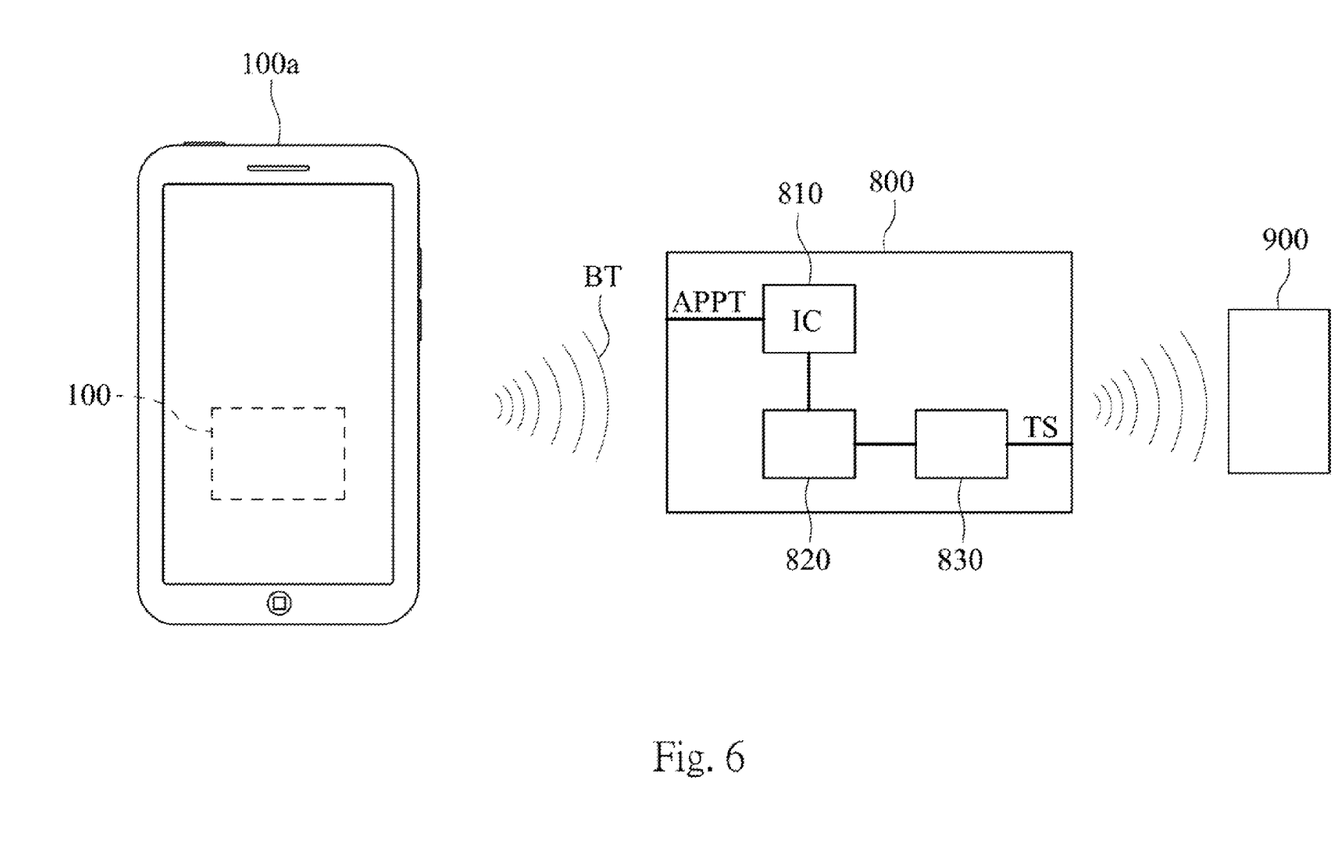
FIG. 6 is a schematic diagram showing a security payment device of the NFC payment module of FIG. 5 incorporated with a point-of-sale (POS) machine.

FIG. 5 is a schematic diagram showing the NFC payment module 100 being applied to the smart electronic device 100a according to further another embodiment of present disclosure. FIG. 6 is a schematic diagram showing a security payment device 800 of the NFC payment module 100 of FIG. 5 incorporated with a POS (point-of-sale) machine 900. In FIG. 5 and FIG. 6, the micro-controller 300, the radio frequency chip 400, the antenna 500 and the security chip 600 are identical as shown in FIG. 2, the NEC payment module 100 further has an active Bluetooth module 700 and the security payment module 800.

The active Bluetooth module 700 is electrically connected to the micro-controller 300, the active Bluetooth module 700 outputs an application verification APPT of the smart electronic device 100a.

The security payment device 800 wirelessly connected to the active Bluetooth module 700, the security payment device 800 has a passive Bluetooth module 810, a security transaction module 820 and a radio frequency module 830. The security payment device 800 can has an appearance as a phone charm for easy to carry, but not limited to it.

The passive Bluetooth module 810 is wirelessly connected to the active Bluetooth module 700 and receives the application verification APPT.

The security transaction module 820 is electrically connected to the passive Bluetooth module 810, the security transaction module 820 has a security transaction verification IC and compares the application verification APPT with the security transaction verification IC. The application verification APPT and the security transaction verification IC can be the key for security payment.

The radio frequency module 830 is wirelessly connected to the security transaction module 820 to receive the transaction signal TS.

In more detailed, the security transaction module 820 commands the radio frequency module 830 to receive the transaction signal TS until the application verification APPT matched the security transaction verification IC, and the security transaction module 820 executes the transaction signal TS.

Figure 7:
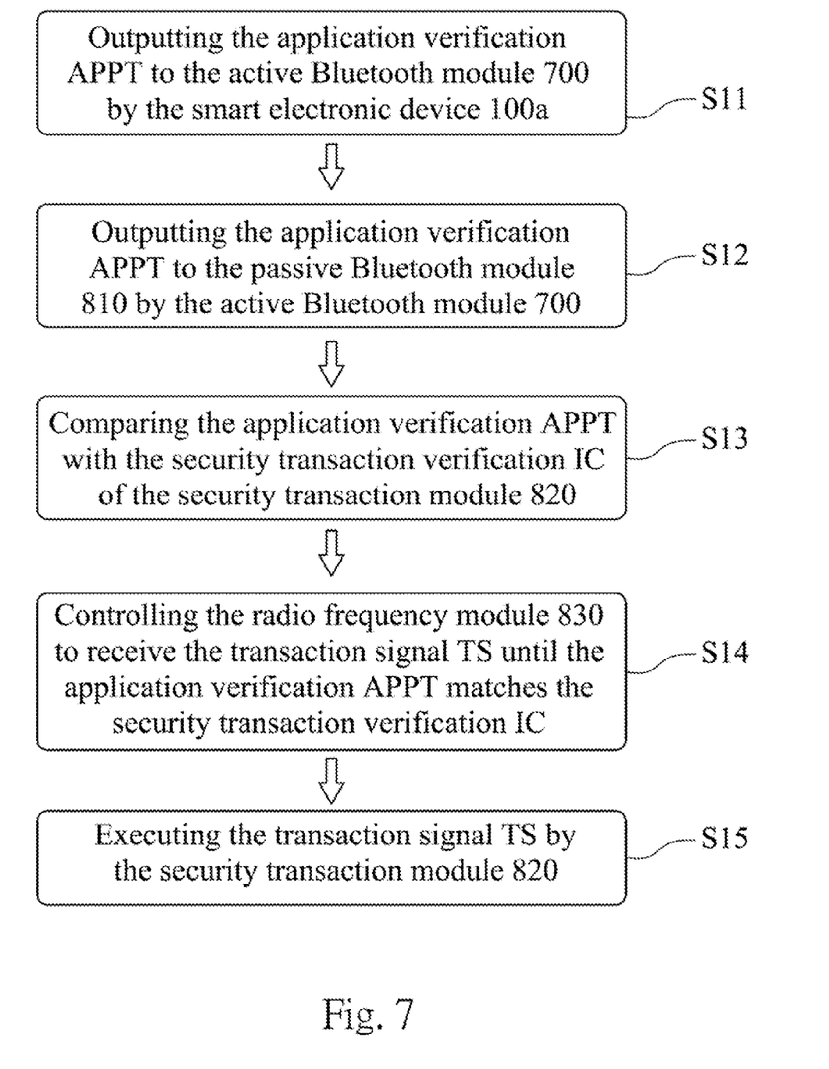
FIG. 7 is a flow chart showing the NFC payment module of FIG. 5 being applied to the smart electronic device.

FIG. 7 is a flow chart showing the NFC payment module 100 of FIG. 5 being applied to the smart electronic device 100a. The steps is following:

Step S11: outputting the application verification APPT to the active Bluetooth module 700 by the smart electronic device 100a.

Step S12: outputting the application verification APPT to the passive Bluetooth module 810 by the active Bluetooth module 700.

Step S13: comparing the application verification APPT with the security transaction verification IC of the security transaction module 820.

Step S14: controlling the radio frequency module 830 to receive the transaction signal TS until the application verification APPT matches the security transaction verification IC.

Step S15: executing the transaction signal TS by the security transaction module 820.

In this embodiment, the smart electronic device 100a activates the security payment device 800 by the active Bluetooth module 700, the wave and pay can be achieved with induction between the security payment device 800 and the POS machine 900 as the security payment device 800 located in the transmission range of the active Bluetooth module 700 and the passive Bluetooth module 810. The POS machine 900 which is conventional technology to businesses for induction payment, it is no longer described in detailed here. Furthermore, the active Bluetooth module 700 and passive Bluetooth module 810 are adopted the Bluetooth low energy (BLE) makes that the Bluetooth module 810 can keep connecting to the active Bluetooth module 700, therefore the smart electronic device 100a can be placed in the bag or the pocket to process the payment with the POS machine 900. When the distance between the activated security payment device 800 and the smart electronic device 100a is out of the Bluetooth transmission range, the smart electronic device 100a alarms the user automatically to avoid lost the security payment device 800 and the risk of the embezzlement.

Figure 8:
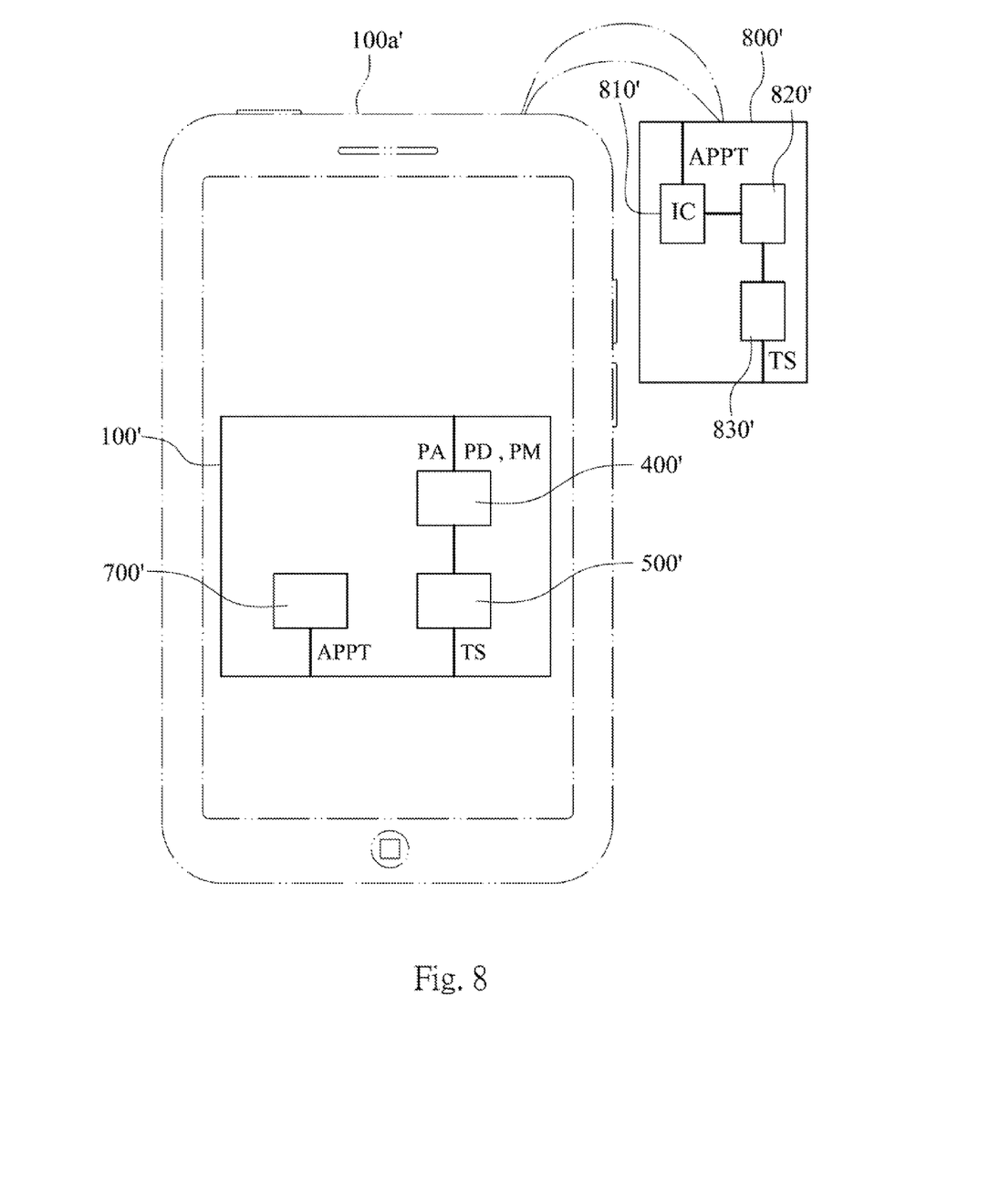
FIG. 8 is a schematic diagram showing the NFC payment module being applied to the smart electronic device according to still another embodiment of present disclosure.

FIG. 8 is a schematic diagram showing the NEC payment module 100' being applied to the smart electronic device 100a' according to still another embodiment of present disclosure. In FIG. 8, the NFC payment module 100' further has active Bluetooth module 700' and the security payment device 800', the security payment device 800' has the passive Bluetooth module 810', the security payment module 820' and the radio frequency module 830'. The operation principle of the NFC payment module 100' which has the radio frequency chip 400 and the antenna 500' is identical with the NFC payment module 100 as shown in FIG. 5, but the NFC payment module 100' without micro-controller and the security chip must work by the hardware/software of the smart electronic device 100a'. The smart electronic device 100a' has controlling features and security verification features, it will be readily apparent to achieve the hardware function by the software program for person having ordinary skill in the art.

The NFC payment module applied to the smart electronic device can be used to achieve wireless payment through outputting the phase detection command with the micro-controller to make the radio frequency chip performs the phase detection command with the antenna, the modulation phase angle of the antenna will be fixed while the modulation phase angle is equal to the specific phase angle of the transaction signal. As a result, it can save the necessary of the large size antenna to keep the wireless transmission.

Moreover, The NFC payment module not only can be installed in the security electronic device directly, but can has multiple payment functions with other installed device, the NFC payment module can be installed in the memory card or smart card for example.

According to the above-mentioned embodiments, it is understood that the present invention NFC payment module and the controlling method thereof have the following advantages:

1. It can stabilizes the signal transmission and avoid the cost of the large size antenna by outputting the phase detection command by the micro-controller to make the radio frequency chip execute the phase detection command with the antenna.

2. The NFC payment module further has the security payment device which has Bluetooth function so as to perform induction payment directly without having to take out the NFC payment module. Furthermore, the radio frequency chip can optimize the signal efficiency to make the NFC payment module be an active-device.

3. In present invention the antenna signal can transmit through the security chip to the micro-controller because the security chip has the SWP signal pin, the traditional antenna has to transform the antenna signal to eh SWP signal to micro-controller by additional bridge chip.

4. The micro-controller, the radio frequency chip, the antenna the security chip and the active Bluetooth module of the NFC payment module of present invention are formed in one, so as to cut down the manufacture procedure and reduce the product size. The integrated NFC payment module can be installed in the security electronic device directly and promote effective use of the inner space of the smart electronic device or providing the well-cooled advantage.

5. In addition, the NFC payment module can eliminate the hardware of the micro-controller and the security chip due to the general smart electronic device almost has the controlling feature and the encryption/decryption feature, it can cost down the NFC payment module and reduce the product size to perform the function of the micro-controller and the security chip by the smart electronic device itself.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A NFC payment module applicable to a smart electronic device, the NFC payment module comprising:
   an encapsulation shell disposed in the smart electronic device;
   a micro-controller disposed in the encapsulation shell, wherein the micro-controller outputs a phase detection command and a power amplification command according to an application program instruction of the smart electronic device;
   a radio frequency chip disposed in the encapsulation shell for executing the phase detection command and the power amplification command;
   an antenna disposed in the encapsulation shell and electrically connected to the radio frequency chip, wherein the antenna receives at least one transaction signal according to the phase detection command, and the transaction signal has a specific phase angle; and
   a security chip disposed in the encapsulation shell, the security chip having a SWP (single wire protocol) signal pin, wherein the security chip is connected to the radio frequency chip and receives the transaction signal by the SWP signal pin to verify the transaction signal and determine the specific phase angle;
   wherein when the transaction signal is verified as invalid by the security chip, the security chip informs the micro-controller for outputting a phase modulating command to inform the radio frequency chip 1 adjust a modulation phase angle.

2. The NFC payment module of claim 1, wherein the radio frequency chip executes the phase detection command to adjust a modulation phase angle until the modulation phase angle is equal to the specific phase angle.

3. The NFC payment module of claim 2, wherein the radio frequency chip adjusts the modulation phase angle according to a time period.

4. The NFC payment module of claim 3, wherein the time period is from 1 milliseconds to 22 milliseconds.

5. The NFC payment module of claim 2, wherein the radio frequency chip adjusts the modulation phase angle according to a phase interval.

6. The NFC payment module of claim 5, wherein the phase interval is from 30 degree to 60 degree.

7. The NFC payment module of claim 6, wherein the phase interval is 45 degree.

8. The NFC payment module of claim 6, wherein the phase interval is 45 degree.

9. The NFC payment module of claim 1, further comprising:
   an active Bluetooth module electrically connected to the micro-controller, the active Bluetooth module outputting an application verification;
   a security payment device, comprising:
   a passive Bluetooth module wirelessly connected to the active Bluetooth module and receiving the application verification;
   a security transaction module electrically connected to the passive Bluetooth module, wherein the security transaction module comprises a security transaction verification and compares the application verification with the security transaction verification; and
   a radio frequency module wirelessly connected to the security transaction module to receive the transaction signal;
   wherein when the security transaction verification matches the application verification, the security transaction module commands the radio frequency module to receive the transaction signal, and the security transaction module executes the transaction signal.

10. A NFC payment module applicable to a smart electronic device, the NFC payment module comprising:
    a radio frequency chip electrically connected to the smart electronic device for executing a phase detection command and a power amplification command which is output from the smart electronic device; and
    an antenna electrically connected to the radio frequency chip for receiving at least one transaction signal according to the phase detection command, wherein the transaction signal has a specific phase angle;
    wherein the smart electronic device outputs a phase modulating command to inform the radio frequency chip to adjust a modulation phase angle while the transaction signal is invalid.

11. The NFC payment module of claim 10, wherein the radio frequency chip executes the phase detection command to adjust a modulation phase angle until the modulation phase angle is equal to the specific phase angle.

12. The NFC payment module of claim 11, wherein the radio frequency chip adjusts the modulation phase angle according to a time period.

13. The NFC payment module of claim 12, wherein the time period is from 1 millisecond to 22 millisecond.

14. The NFC payment module of claim 11, wherein the radio frequency chip adjusts the modulation phase angle according to a phase interval.

15. The NFC payment module of claim 14, wherein the phase interval is from 30 degree to 60 degree.

16. The NFC payment module of claim 10, further comprising:

an active Bluetooth module electrically connected to the smart electronic device, the active Bluetooth module outputting an application verification;

a security payment module, comprising:
a passive Bluetooth module wirelessly connected to the active Bluetooth module and receiving the application verification;
a security transaction module electrically connected to the passive Bluetooth module, wherein the security transaction module has a security transaction verification and the security transaction module compares the application verification with the security transaction; and
a radio frequency module wirelessly connected to the security transaction module to receive the transaction signal;
wherein when the security transaction verification matches the application verification, the security transaction module commands the radio frequency module to receive the transaction signal, and the security transaction module executes the transaction signal.

17. A NFC payment module controlling method for performing payment transaction by a smart electronic device with a NFC payment module, the NFC payment module controlling method comprising:
executing an application program instruction to a micro-controller of the NFC payment module by the smart electronic device;
outputting a phase detection command and a power amplification command to a radio frequency chip of the NFC payment module by the micro-controller according to the application program instruction;
executing the phase detection command and the power amplification command by the radio frequency chip;
adjusting a modulation phase angle and receiving at least one transaction signal in a time period and a phase interval according to the phase detection command by an antenna of the NFC payment module, wherein the transaction signal has a specific phase angle;
verifying the transaction signal and determining the specific phase angle by a security chip of the NFC payment module; and
controlling the micro-controller to output a phase modulating command by the security chip to inform the radio frequency chip to adjust the modulation phase angle until the modulation phase angle is equal to the specific phase angle.

18. The NFC payment module controlling method of claim 17, wherein controlling the micro-controller by the security chip to output a phase modulating command to inform the radio frequency chip to adjust the modulation phase angle until the modulation phase angle is equal to the specific phase angle is performed by adjusting the modulation phase angle in five seconds period and 45 degree interval by an antenna of the NFC payment module.

19. The NFC payment module controlling method of claim 17, wherein before executing an application program instruction to a micro-controller of the NFC payment module by the smart electronic device, the NFC payment module controlling method further comprises:
outputting an application verification to an active Bluetooth module of the NFC payment module by the micro-controller of the smart electronic device;
outputting the application verification to a passive Bluetooth module of a security payment device by the active Bluetooth module;
comparing the application verification with a security transaction verification by a security transaction module of the security payment device;
controlling a radio frequency module of the security payment device to receive the transaction signal until the application verification matches the security transaction verification; and
executing the transaction signal by the security transaction module.

20. A NFC payment module controlling method for performing payment transaction by a smart electronic device with a NFC payment module, the NFC payment module controlling method comprising:
executing an application program instruction by a micro-controller of the smart electronic device;
outputting a phase detection command and a power amplification command to a radio frequency chip of the NFC payment module according to the application program instruction by the micro-controller;
executing the phase detection command and the power amplification command by the radio frequency chip;
adjusting a modulation phase angle and receiving at least one transaction signal in a time period and a phase interval according the phase detection command by an antenna of the NFC payment module, which the transaction signal has a specific phase angle;
verifying the transaction signal and determining the specific phase angle by a security chip of the smart electronic device; and
controlling the micro-controller to output a phase modulating command by the security chip to inform the radio frequency chip to adjust the modulation phase angle until the modulation phase angle is equal to the specific phase angle.

21. The NFC payment module controlling method of claim 20, wherein controlling the micro-controller to output a phase modulating command by the security chip to inform the radio frequency chip to adjust the modulation phase angle until the modulation phase angle is equal to the specific phase angle is performing by adjusting the modulation phase angle in five seconds period and 45 degree interval by an antenna of the NFC payment module.

22. The NFC payment module controlling method of claim 20, further comprising:
outputting an application verification to an active Bluetooth module of the NFC payment module by the micro-controller of the smart electronic device;
outputting the application verification to a passive Bluetooth module of a security payment device by the active Bluetooth module;
comparing the application verification with a security transaction verification of a security transaction module of the security payment device;
controlling a radio frequency module of the security payment device to receive the transaction signal when the application verification matches the security transaction verification; and
executing the transaction signal by the security transaction module.

* * * * *